United States Patent
Konno et al.

(10) Patent No.: US 7,591,158 B2
(45) Date of Patent: Sep. 22, 2009

(54) VEHICLE LOCKING APPARATUS

(75) Inventors: Takeshi Konno, Saitama (JP); Tadashi Onozuka, Saitama (JP); Kazuo Yuhi, Miyazaki (JP)

(73) Assignees: Honda Motor Co., Ltd., Tokyo (JP); HondaLock Mfg. Co., Ltd., Miyazaki (JP)

( * ) Notice: Subject to any disclaimer, the term of this patent is extended or adjusted under 35 U.S.C. 154(b) by 0 days.

(21) Appl. No.: 10/954,655

(22) Filed: Oct. 1, 2004

(65) Prior Publication Data
US 2005/0115757 A1 Jun. 2, 2005

(30) Foreign Application Priority Data
Oct. 3, 2003 (JP) .............................. 2003-346194

(51) Int. Cl.
*B60R 25/02* (2006.01)
*E05B 65/12* (2006.01)

(52) U.S. Cl. .............................. 70/252; 70/184; 70/386; 70/DIG. 30

(58) Field of Classification Search ............... 70/252, 70/182–185, 386, DIG. 30, 525
See application file for complete search history.

(56) References Cited

U.S. PATENT DOCUMENTS

| | | | | |
|---|---|---|---|---|
| 1,671,521 A | * | 5/1928 | Fisher | 192/56.5 |
| 4,688,036 A | * | 8/1987 | Hirano et al. | 340/5.62 |
| 5,040,652 A | * | 8/1991 | Fish et al. | 70/189 |
| 5,291,067 A | * | 3/1994 | Nakajima et al. | 307/9.1 |
| 5,656,867 A | * | 8/1997 | Kokubu | 307/10.5 |
| 6,105,405 A | * | 8/2000 | Westwinkel | 70/371 |
| 6,257,031 B1 | * | 7/2001 | Misner | 70/252 |
| 6,260,651 B1 | * | 7/2001 | Kokubu et al. | 180/287 |
| 6,354,120 B1 | * | 3/2002 | Tan et al. | 70/252 |
| 6,442,985 B1 | * | 9/2002 | Watanuki et al. | 70/186 |
| 6,508,088 B1 | * | 1/2003 | Barbier et al. | 70/186 |

(Continued)

FOREIGN PATENT DOCUMENTS

DE 101 06 123 A1 9/2002

(Continued)

OTHER PUBLICATIONS

Japanese Office Action dated Aug. 1, 2007, Application No. 2003-346194.

*Primary Examiner*—Peter M Cuomo
*Assistant Examiner*—Christopher Boswell
(74) *Attorney, Agent, or Firm*—Westerman, Hattori, Daniels & Adrian, LLP.

(57) ABSTRACT

The keyless engine starting system includes a turning shaft 93 connected to a handle lock for locking and unlocking. The keyless engine starting system also includes a knob 92 having a cylindrical support portion which is turnably fitted along an outer periphery of the shaft 93. The shaft 93 is in engagement with a pawl 33 when the knob 92 is in a predetermined lock position to limit the turning motion of the shaft 93. The engagement of pawl 33 with respect to the shaft 93 is released in response to a releasing signal from outside. The keyless engine starting system also includes a click ball 95, a spring 94 and a recess 922 which form a torque limiter mechanism for connecting the knob 92 with the shaft 93. If the shaft 93 is forcibly turned, the knob 92 turns free without engaging the shaft 93.

5 Claims, 7 Drawing Sheets

U.S. PATENT DOCUMENTS

| | | | |
|---|---|---|---|
| 6,527,314 B2 * | 3/2003 | Brown | 292/336.3 |
| 6,718,805 B2 * | 4/2004 | Okuno | 70/186 |
| 6,810,700 B2 * | 11/2004 | Okuno | 70/186 |
| 6,941,779 B2 * | 9/2005 | Shigeyama et al. | 70/186 |
| 2003/0231100 A1 * | 12/2003 | Chung | 340/5.2 |
| 2004/0003632 A1 * | 1/2004 | Ohtaki et al. | 70/252 |
| 2004/0227615 A1 * | 11/2004 | John et al. | 340/5.61 |

FOREIGN PATENT DOCUMENTS

| | | |
|---|---|---|
| EP | 0 742 127 A2 | 11/1996 |
| JP | 63-39069 | 3/1988 |
| JP | 1130540 | 5/1989 |
| JP | 08-282441 | 10/1996 |
| JP | 10-317754 | 12/1998 |
| JP | 2002240757 | 8/2002 |
| JP | 2003-064918 | 3/2003 |
| JP | 2003261008 | 9/2003 |

* cited by examiner

VEHICLE LOCKING APPARATUS

BACKGROUND OF THE INVENTION

1. Field of the Invention

The present invention relates to a vehicle locking apparatus, and more particularly, to a vehicle locking apparatus which is used especially for a keyless engine starting system and which is not unlocked by improper unlocking operation.

2. Description of the Related Art

In a four-wheel automobile, there is a known keyless engine starting system designed such that a person having a remote key (e.g., a card key) approaches his or her locked vehicle and enters a predetermined approving area, a door of the vehicle is unlocked and its engine can be started. According to this keyless entry system, if the person having the card key moves away from the vehicle, the door is locked and the engine cannot start. The keyless entry system is described in Japanese Patent Application Laid-open No. H10-317754 for example.

As the keyless entry system, in order to prevent erroneous control of the system or to reduce the a battery consumption, there is a known system having a normal mode for sending a remote control signal to the vehicle and an output stop mode for stopping the output of the control signal (Japanese Patent Application Laid-open No. 2003-64918).

In the keyless engine starting system, there is a possibility that a locked state of an engine starting switch is improperly unlocked without using a proper remote key. That is, since the engine starting switch is provided with a knob so that the switch can be turned, there is a possibility that the locked state is improperly unlocked by forcibly turning the knob using a tool.

SUMMARY OF THE INVENTION

In view of the above problem, it is an object of the present invention to provide a vehicle locking apparatus which can not forcibly be unlocked without using an appropriate remote key.

The first feature of the present invention provides a vehicle locking apparatus comprising a turning shaft connected to a handle lock of a vehicle for displacing the handle lock to a lock position and an unlock position, an operation knob which can be engaged in one end of the turning shaft with a cylindrical portion, a connecting means having a torque limiter mechanism for connecting the operation knob and the turning shaft to each other, and an electromagnetic actuator which engages a pawl member with the turning shaft when the operation knob is in a predetermined lock position to limit the turning motion of the turning shaft, and which releases the limitation in response to a releasing signal from outside.

The second feature of the present invention provides a vehicle locking apparatus, wherein the torque limiter mechanism comprises a clickball which is accommodated in the turning shaft and resiliently biased in an outer peripheral direction of the turning shaft, and a recess formed in the cylindrical portion of the operation knob such that the click ball is fitted into the recess.

The third feature of the present invention provides a vehicle locking apparatus, wherein a torque limit value of the torque limiter mechanism is equal to or higher than a predetermined turning operation torque of the operation knob and the turning shaft, and is smaller than an engagement strength between the pawl member and the turning shaft.

The fourth feature of the present invention provides a vehicle locking apparatus, wherein when the torque limiter mechanism is operated and the connection between the turning shaft and the operation knob is released, if the operation knob is turned to the predetermined lock position, the clickball is fitted into the recess formed in the cylindrical portion of the operation knob.

The fifth feature of the present invention provides a vehicle locking apparatus, wherein the operation knob is flush with a mounting surface of the lock apparatus with respect to the vehicle.

The sixth feature of the present invention provides a vehicle locking apparatus, further comprising an emergency releasing mechanism for releasing the engagement of the engaging pawl at the time of emergency instead of the electromagnetic actuator, an immobilizer sending/receiving circuit which carries out communication with an ECU of the vehicle to give a starting permission of the vehicle, and a seat unlocking switch for unlocking a seat lock apparatus which also functions as a lid of an accommodating chamber provided in the vehicle.

According to the invention having the above feature, the engagement of the pawl member and the turning apparatus is released by energizing the electromagnetic actuator means, and the operation knob can be turned. If an attempt is made to turn the operation knob using torque exceeding the predetermined operation torque without energizing the electromagnetic actuator means, the torque limiter mechanism is operated, the connection between the operation knob and the turning shaft is released, and the operation knob turns free without engaging the turning shaft.

Especially according to the fourth feature, after the operation knob is brought into the free turning condition, the click ball is fitted into the recess on the cylindrical portion at a predetermined lock position, and the torque limiter mechanism function is reset.

According to the fifth feature, since the operation knob does not project from its mounting surface, it is difficult to apply large torque using a tool or the like.

According to the sixth feature, since the vehicle locking mechanism is modularized, assembling and maintenance thereof are easy.

DETAILED DESCRIPTION OF THE PREFERRED EMBODIMENT

Figure 5:
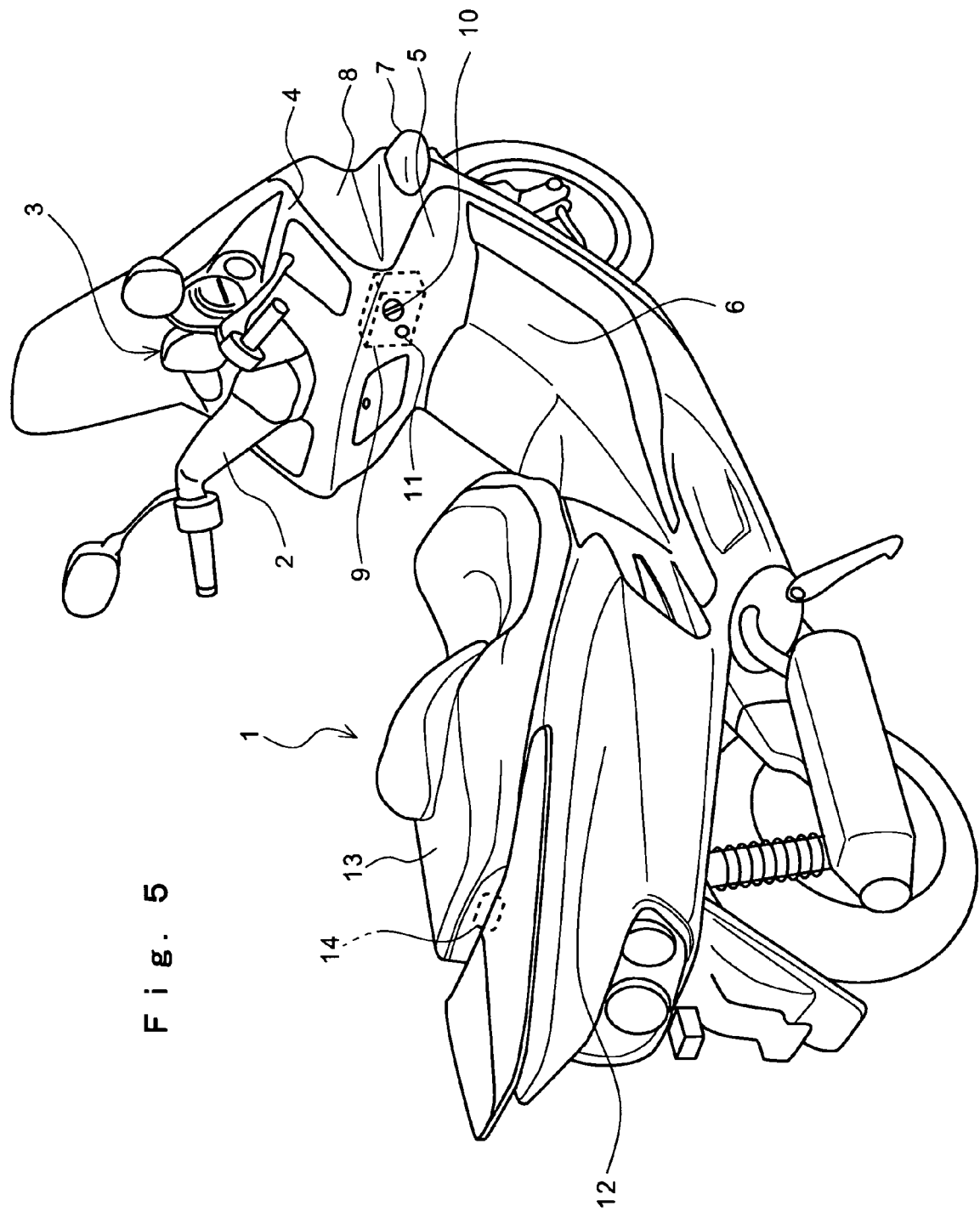
FIG. 5 is a perspective view of a two-wheel motor vehicle to which a lock apparatus of the present invention is applied.

An embodiment of the present invention will be explained with reference to the drawings. FIG. 5 is a perspective view of an outer appearance of a scooter type two-wheeled motor vehicle having the vehicle locking apparatus of the embodiment of the invention. In FIG. 5, the scooter type two-wheeled motor vehicle 1 is provided at its front portion with a steering handle 2 which is turnably supported by a vehicle body frame through a shaft (not shown). A panel 4 on which a meter 3 is disposed is disposed around the handle 2. One end of the panel 4 is connected to a vertical panel 5, and the vertical panel 5 is connected to a floor 6. A front portion of the panel 4 (front portion of the vehicle) is connected to a front cowl 8 on which a headlight and a blinkers 7 are disposed. The panel 4 and the front cowl 8 cover an inner space. A handle lock module 9 is accommodated in the inner space. The handle lock module 9 includes a knob switch 10 for starting the engine. The knob switch 10 has an operating portion, i.e., a knob provided on the panel 4. The knob is exposed outside. A lock bar (not shown) follows the operation of the knob switch 10. The handle lock module 9 also includes a mechanism which brings the lock bar into engagement in a lock hole formed in the shaft of the handle 2 so that the handle 2 cannot turn. The handle lock module 9 also includes a seat unlocking switch 11. As a concrete structure of the handle lock, a structure disclosed in Japanese Patent Application Laid-open No. H9-301239 can be employed.

A rear cowl 12 is connected to the front cowl 8. A passenger seat 13 is disposed on an upper portion of the rear cowl 12. The seat 13 also functions as a lid which covers a fuel tank and an accommodation box (both not shown) for accommodating a helmet. Both the fuel tank and the accommodation box are covered with the rear cowl 12. Since the seat 13 functions as the lid, the seat 13 can freely open and close, and includes an electric locking apparatus 14 which is operated by a solenoid.

Figure 6:
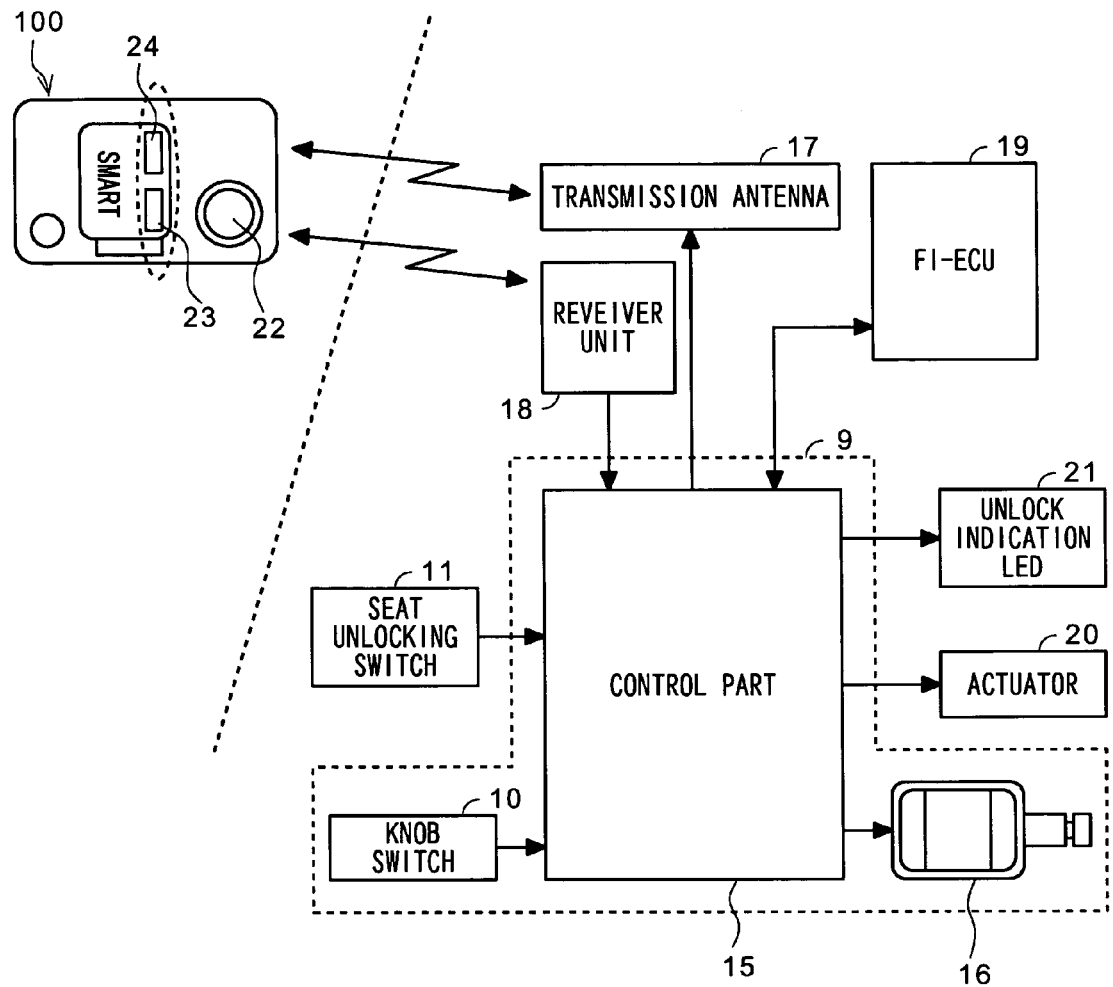
FIG. 6 is a block diagram of an entire keyless engine starting system of an embodiment of the invention.

FIG. 6 is a block diagram of the entire keyless engine starting system including the handle lock module 9. The handle lock module 9 includes a control section 15 having a microcomputer, the knob switch 10, the seat unlocking switch 11, and a solenoid 16 as an actuator which unlocks a lock that limits the turning motion of the knob switch 10. Connected to the control section 15 are a transmission antenna 17 and a receiving unit 18 for carrying out communication with a remote key 100, a fuel injection control FI-ECU (simply "ECU", hereinafter) 19, and an actuator, i.e., a solenoid 20 for unlocking the seat locking apparatus 14. A display LED 21 which is lit when the handle lock is unlocked to show that the handle is unlocked can be connected to the control section 15. The display LED 21 can be provided on the panel 4 for example.

The remote key 100 includes a push button 22, a display light 23 and another display light 24. The display light 23 and the display light 24 preferably comprise LEDs. Functions of the display light 23 and the display light 24 will be described later.

Figure 7:
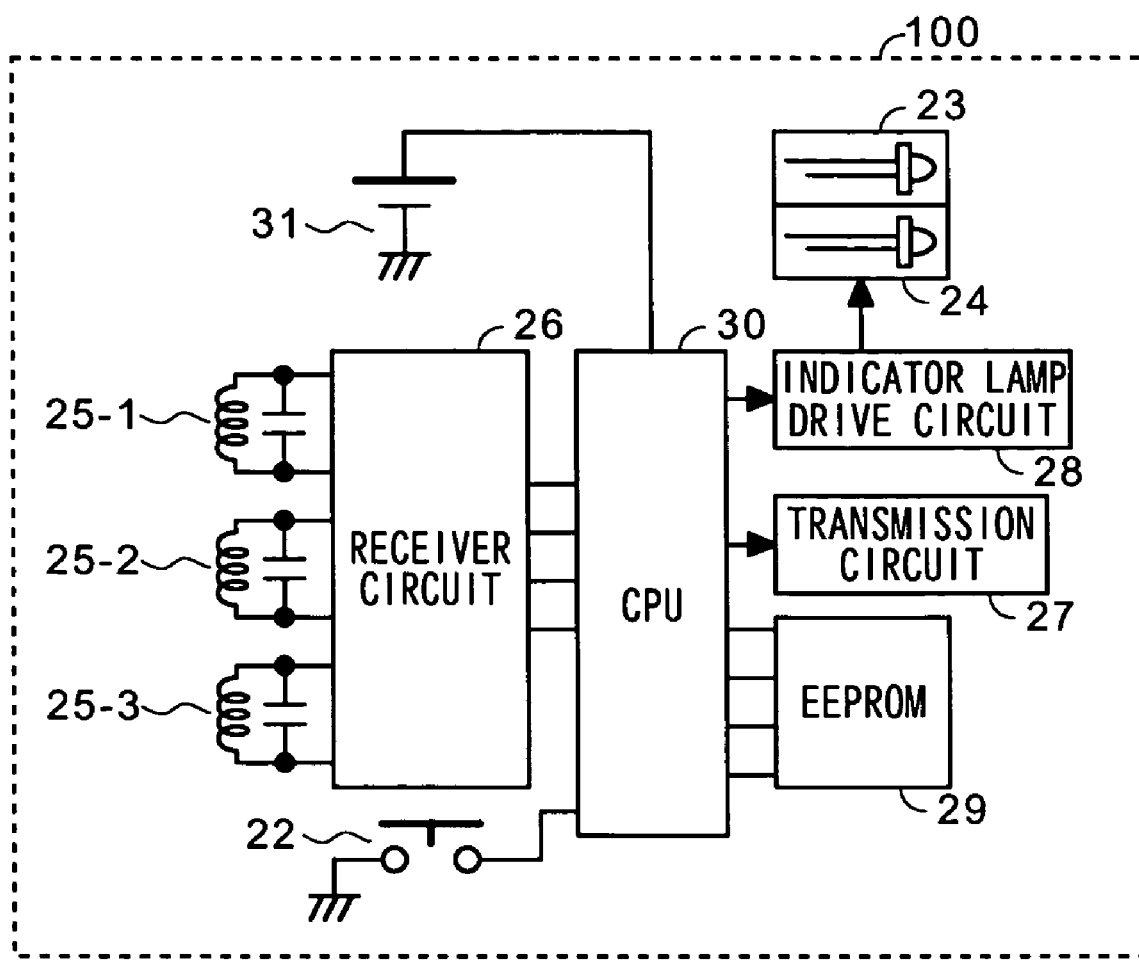
FIG. 7 is a block diagram showing a structure of a remote key.

FIG. 7 is a block diagram showing a structure of the remote key 100. The remote key 100 has a communication function which carries out communication with the handle lock module 9 of the vehicle to transmit ID information. The remote key 100 includes a receiving circuit 26 to which a plurality of nondirectional antennas 25-1, 25-2 and 25-3 are connected for transmitting and receiving information. The remote key 100 also includes a transmission circuit 27, a display light operating circuit 28 for operating a display light (green LED) 23 and a display light (red LED) 24, an EEPROM 29 as a storing device for storing control data, and a CPU 30 for controlling these constituent elements. The remote key 100 is driven by a power supply 31 incorporated in the remote key 100. The power supply 31 is a lithium battery for example. A signal corresponding to a state of the push button 22 is input to the CPU 30.

The CPU 30 has a function for making it possible or impossible to receive a signal from the handle lock module 9 in accordance with the state of the push button 22. That is, it is possible to response a signal sent from the handle lock module 9 and to ignore the sent signal.

Figure 8:
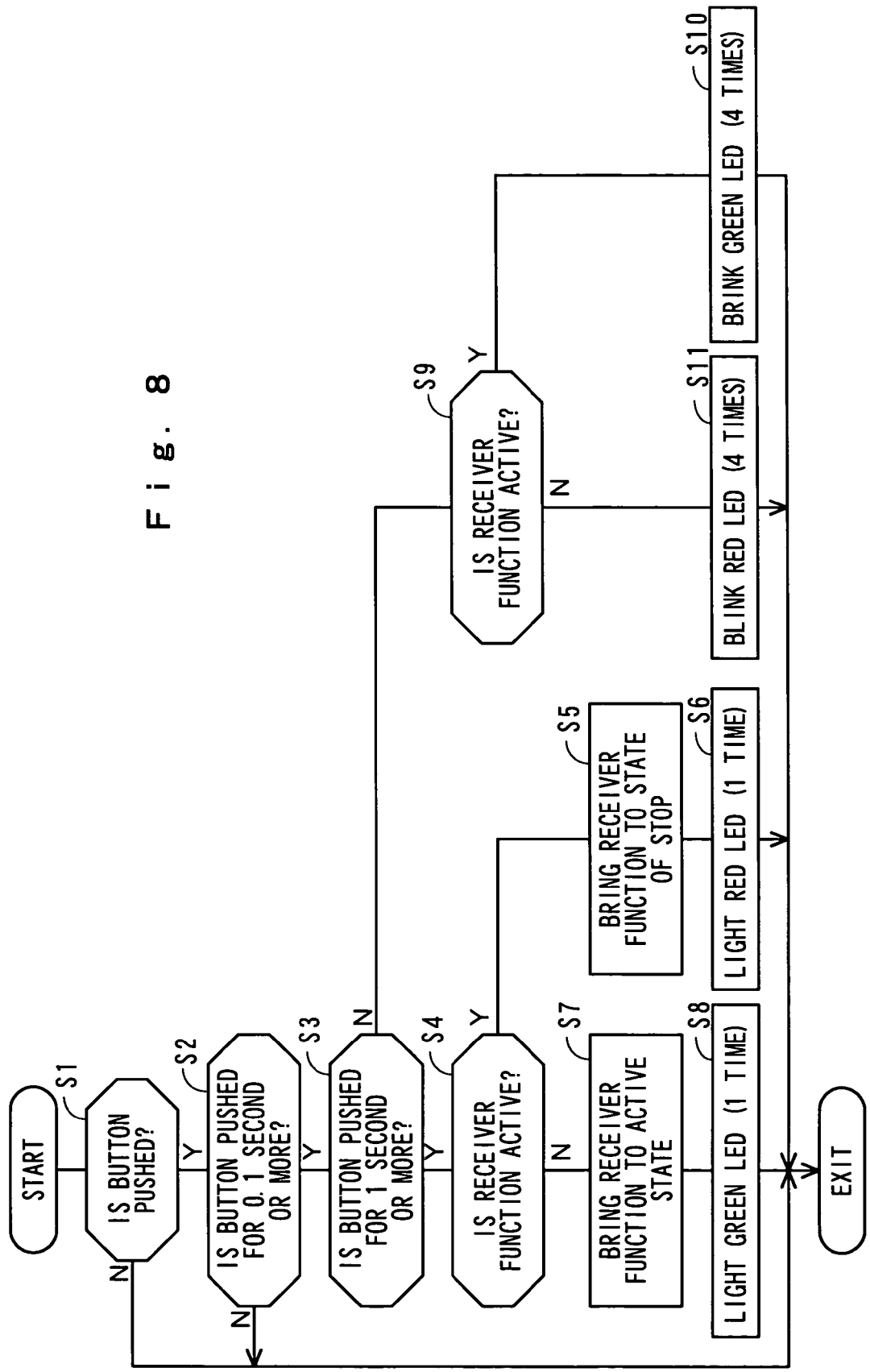
FIG. 8 is a flowchart showing processing in the remote key based on operation of a push button.

FIG. 8 is a flowchart of processing of the CPU 30 carried out based on operation of the push button 22. In step 1, it is determined whether the push button 22 is pushed. If step S1 is affirmative, the procedure is proceeded to step S2. In step S2, it is determined whether the push button 22 is pushed continuously for time T (0.1 seconds) or longer. If step S2 is affirmative, it is determined that the push button 22 is normally operated, and the procedure is proceeded to step S3. If the push button 22 is pushed for less than the time T, it is determined that the operation is error, and the procedure is jumped to end. In step S3, it is determined whether the push button 22 is pushed continuously for second predetermined time T (T1>T, e.g., 1 second). If step S3 is affirmative, it is determined that the push button 22 is pushed for long time (long time pushing), and the procedure is proceeded to step S4.

In step S4, it is determined whether the receiving circuit 26 of the current remote key 100 is active, i.e., the receiving circuit 26 is waiting for reception of a signal. If the receiving circuit 26 is active, the procedure is proceeded to step S5, where the receiving circuit 26 is brought in to a stop state, i.e., a function stop state. In order to show that the receiving circuit 26 is brought into the function stop state, the procedure is proceeded to step S6 where the red LED 24 is lit. The lit state here is completed for a predetermined short time. That is, the red LED is lit only momentarily.

If step S4 is negative, the procedure is proceeded to step S7, where the receiving circuit 26 is brought into the active state. In order to show that the receiving circuit 26 is in the waiting state, the procedure is proceeded to step S8, where the green LED 23 is lit. The lit state here is completed for a predetermined short time. That is, the red LED is lit only momentarily.

If step S3 is negative, i.e., if the push button 22 is pushed for short time shorter than the long time push, i.e., the push button 22 is operated momentarily, the procedure is proceeded to step S9, where it is determined whether the receiving circuit 26 is in the waiting state. If step S9 is affirmative, the procedure is proceeded to step S10, where the green LED 23 is lit to shown that the receiving circuit 26 is the waiting state. The number of flashings is four for example. If step S9 is negative, the procedure is proceeded to step S11, where the red LED 24 is lit to show that the receiving circuit 26 is in the function stop state. The number of flashings is four for example.

The receiving circuit 26 can be brought into the stop state by carrying out any of the following processing. First, the power supply of the receiving circuit 26 is shut off. Secondary, even if a signal is received, the CPU 30 is not actuated. That is, the CPU 30 is not brought into a run mode. Thirdly, even if the CPU 30 is actuated, validation processing of received ID information is not carried out.

The entire keyless engine starting system shown in FIG. 6 is operated when the push button 22 is operated and the receiving circuit 26 of the remote key 100 is active and the remote key 100 is brought into the approving area. Even if the remote key 100 is brought into the approving area when the receiving circuit 26 is in the stop state, the system is not operated. Therefore, when the remote key 100 is in the approving area, i.e., when a person having the remote key 100 is out from the approving area, the keyless engine starting system is in its initialized state, and each locking apparatus is locked.

Figure 1:
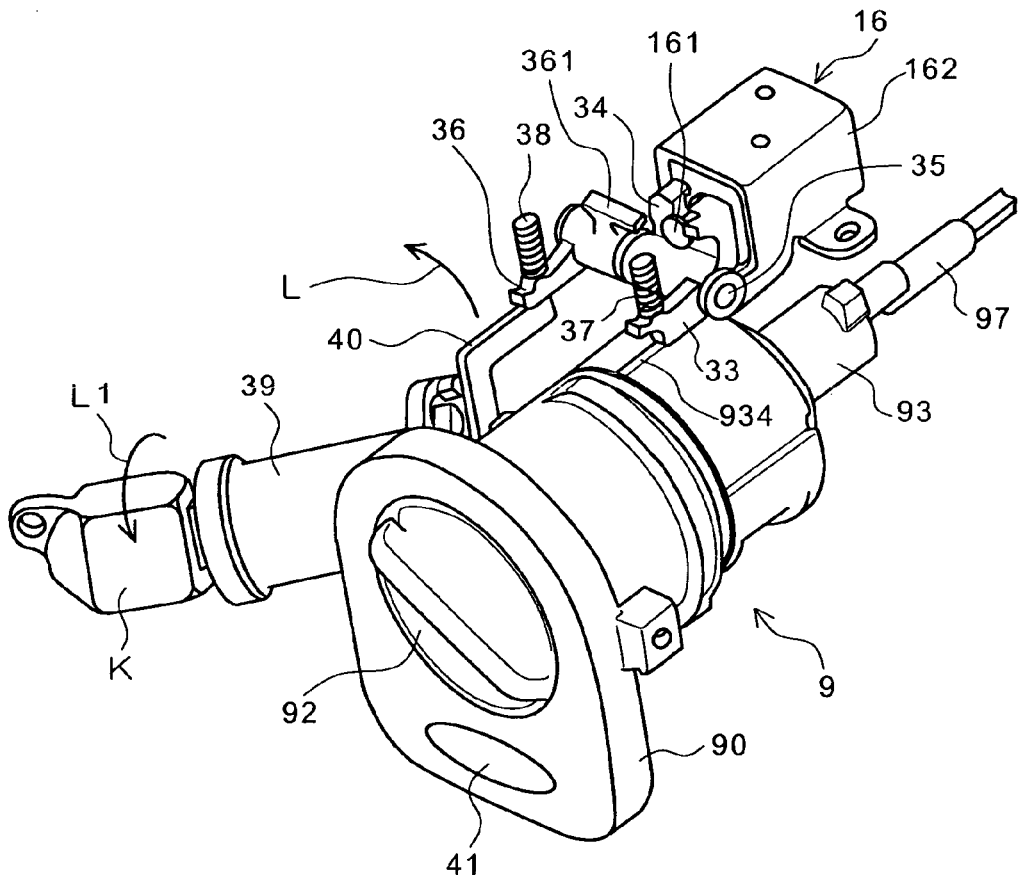
FIG. 1 is a perspective view of an outer appearance of the handle lock module.
Figure 2:
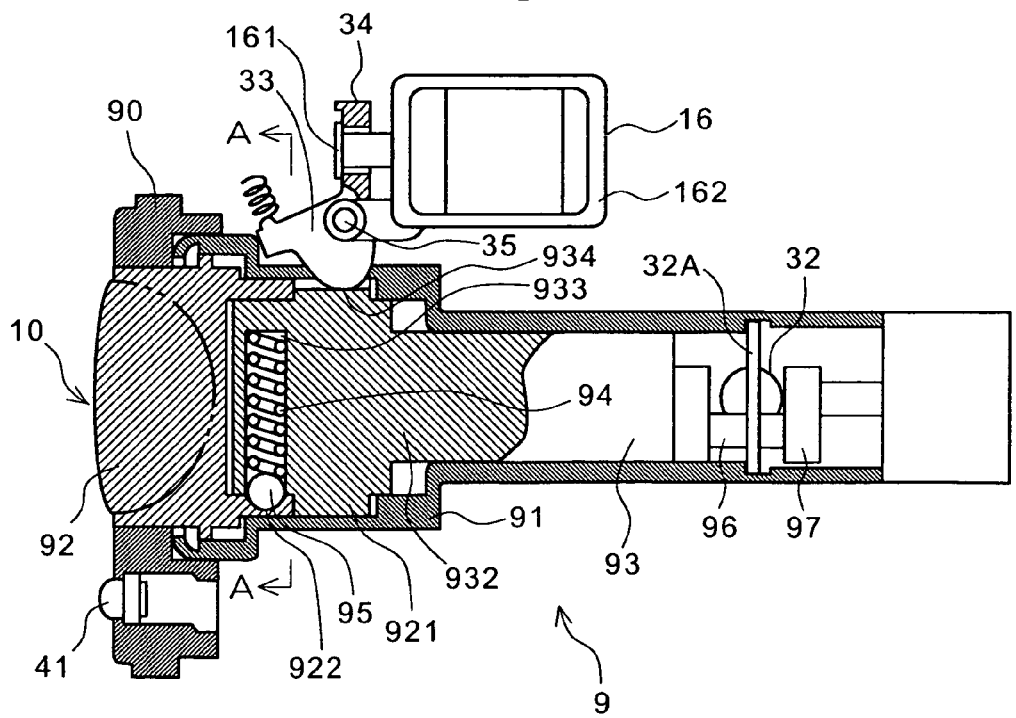
FIG. 2 is a sectional view of the handle lock module.
Figure 3:
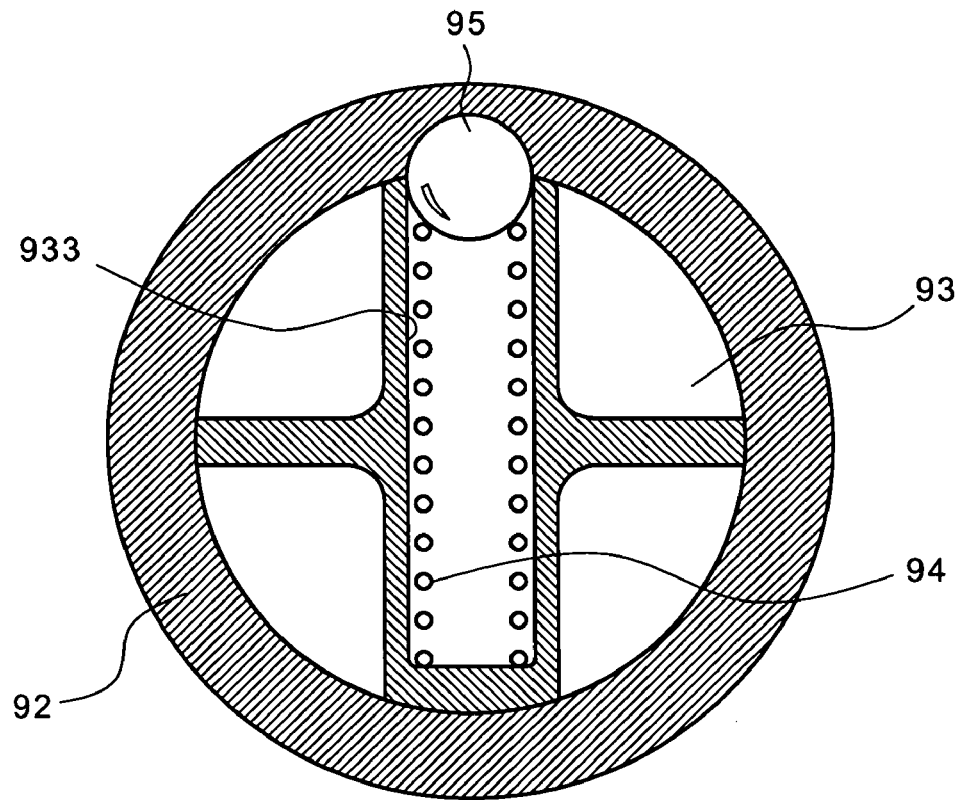
FIG. 3 is a sectional view taken along the A-A line in FIG. 2.

FIG. 1 is a perspective view of an outer appearance of the handle lock module, FIG. 2 is a sectional view thereof, and FIG. 3 is a sectional view taken along the A-A line in FIG. 2. In these drawings, the handle lock module 9 includes a flange 90 for mounting the handle lock module 9 on the panel 4 of the two-wheeled motor vehicle. An end of a cylindrical housing 91 constituting the knob switch 10 is fitted to the flange 90. A knob 92 and a turning shaft 93 are inserted into the housing 91. A head of the turning shaft 93, i.e., a large-diameter portion 932 of the turning shaft 93 closer to the knob 92 is formed with a bottomed spring-accommodating hole 933. The spring-accommodating hole 933 extends across the turning shaft 93 in a radial direction. A coil spring 94 and a click ball 95 which abuts against a tip end of the coil spring 94 are accommodated in the spring-accommodating hole 933.

The click ball 95 is pushed against an inner surface of a cylindrical extension 921 of the knob 92 by a repulsion of the spring 94. The inner surface of the cylindrical extension 921 of the knob 92 has a recess 922. The click ball 95 is fitted into the recess 922 when the knob 92 is turned to an initial position, i.e., a lock position (which will be described later). The click ball 95 and the recess 922 function as torque limiter mechanism in which when the knob 92 is operated with a torque of a predetermined value or greater, the click ball 95 comes out of the recess 922 and the engagement between the knob 92 and the turning shaft 93 is released.

A spring constant and a size of the ball as well as the shape of the recess 922 are designed such that the engagement between the click ball 95 and the recess 922 is released when a torque which is estimated to be applied when the knob 92 is normally operated, i.e., a torque generated when the engagement of a later-described retaining pawl 33 and the turning shaft 93 is forcibly released, more concretely, a torque which is keyless engine starting system than a torque which generates strength for destroying the retaining pawl 33 is applied.

The knob 92 is slightly projecting from the flange 90, and since the knob 92 is substantially flush with the flange 90, it is difficult to operate using a tool other than fingers.

A rear end of the turning shaft 93, i.e., a portion of the turning shaft 93 which is away from the knob 92 is provided with a crank 97 having a connecting shaft 96 which is eccentric from the turning shaft 93. The connecting shaft 96 is connected to an end 32A of a lock bar 32. Therefore, if the turning shaft 93 is turned, the connecting shaft 96 is displaced with respect to a center axis of the turning shaft 93. If the turning shaft 93 is displaced, the lock bar 32 moves toward and away from the shaft of the handle 2, thereby locking and unlocking the handle 2.

Engaging apparatuses, i.e., the solenoid 16 and the retaining pawl 33 are provided for limiting the turning motion of the turning shaft 93 to prohibit the operation of the knob switch 10 and for prohibiting the unlock of the handle lock. A plunger 161 of the solenoid 16 is engaged with a link 34, and the retaining pawl 33 which break into the housing 91 and is engaged with a retaining groove 934 of the turning shaft 93 is connected to the link 34. The retaining pawl 33 engages with the retaining groove 934 of the turning shaft 93 when the knob switch 10 is in the lock position.

The link 34 is supported by an outer case 162 of the solenoid 16 by a support shaft 35. An emergency releasing pawl 36 is turnably provided on an extension of the support shaft 35. The emergency releasing pawl 36 turns around the support shaft 35. The pawls 33 and 36 are biased downward by coil springs 37 and 38. A lower surface of the emergency releasing pawl 36 abuts against an upper surface of a link 40 extending from an emergency releasing key cylinder 39.

When the solenoid 16 is not energized, i.e., when the unlocking operation is not carried out, since the plunger 161 can freely move, the retaining pawl 33 is biased toward the turning shaft 93 by the coil spring 37, and the retaining pawl 33 is pushed against the retaining groove 934. If the ID information is certified between the remote key 100 and the handle lock module 9, the solenoid 16 is driven, the plunger 161 is pulled inward and the link 34 turns around the support shaft 35. As a result, the retaining pawl 33 is released from the retaining groove 934, the turning shaft 93 can turn, and the knob switch 10 is allowed to be operated.

An emergency releasing key K is used when the locked state can not be unlocked by the remote key 100. The emergency releasing key K is used in such a manner that the emergency releasing key K is inserted into the emergency releasing key cylinder 39. If the emergency releasing key K is turned in the direction of L1, the link 40 turns in the direction of the arrow L in FIG. 1 to push up the emergency releasing pawl 36. With this operation, an end operating section 361 of the emergency releasing pawl 36 abuts against the link 34 to push the plunger 161 into the solenoid 16. With this operation, the retaining pawl 33 is pushed upward in the same manner as that when the solenoid 16 is driven.

If the solenoid 16 is driven by improper operation to forcibly turn the knob switch 10, since the retaining pawl 33 is in engagement with the turning shaft 93, the knob switch 10 can not be turned. If an attempt is made to turn the knob switch 10 by a greater force using a tool or the like, the click ball 95 is released from the groove 92, and the knob 92 turns free with respect to the turning shaft 93.

When the knob 92 turns free without engaging the turning shaft 93 by the torque limiter mechanism, if the knob 92 turns once, the click ball 95 is again fitted into the groove 92 and thus, in a state in which the retaining pawl 33 is released, the turning shaft 93 is returned into a state in which the turning shaft 93 can be turned by using the knob 92 with normal operation torque.

Figure 4:
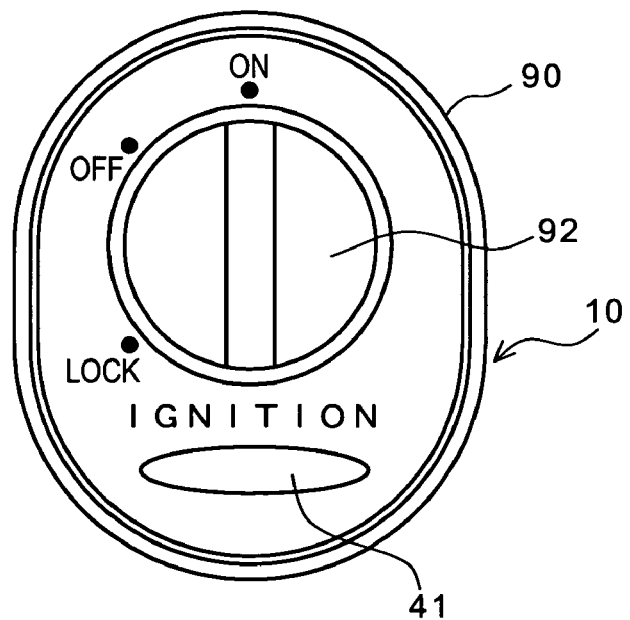
FIG. 4 is a front view of an outer appearance of a knob switch.

FIG. 4 is a front view showing one example of the knob switch 10. The knob switch 10 is in the lock position in its initial state. In this state, the knob switch 10 is locked, and the knob switch 10 can be pushed but can not be turned. If the knob 92 of the knob switch 10 is pushed, communication with respect to the remote key 100 is started, and if the ID information is certified, the solenoid 16 is driven, then the knob switch 10 can be turned. If the knob 92 of the knob switch 10 is turned to an ON position shown in FIG. 4, the control section 15 carries out communication with the ECU 19 to certify the ID information. If the ID information is certified between the ECU 19 and the handle lock module 9, the handle lock is unlocked, the engine can be started, and the function of the seat unlocking switch 11 for unlocking the seat lock apparatus 14 is activated. If an ignition switch 41 which is adjacent to the knob switch 10 is pushed, the starting operation of the engine, i.e., driving operation of an engine starting motor, fuel injection operation, igniting operation and the like are started. Instead of providing the ignition switch 41 separately from the knob switch 10, the starting position (ignition position) may be set in the knob switch 10. The starting switch may separately be provided in the vicinity of the handle grip.

Figure 9:
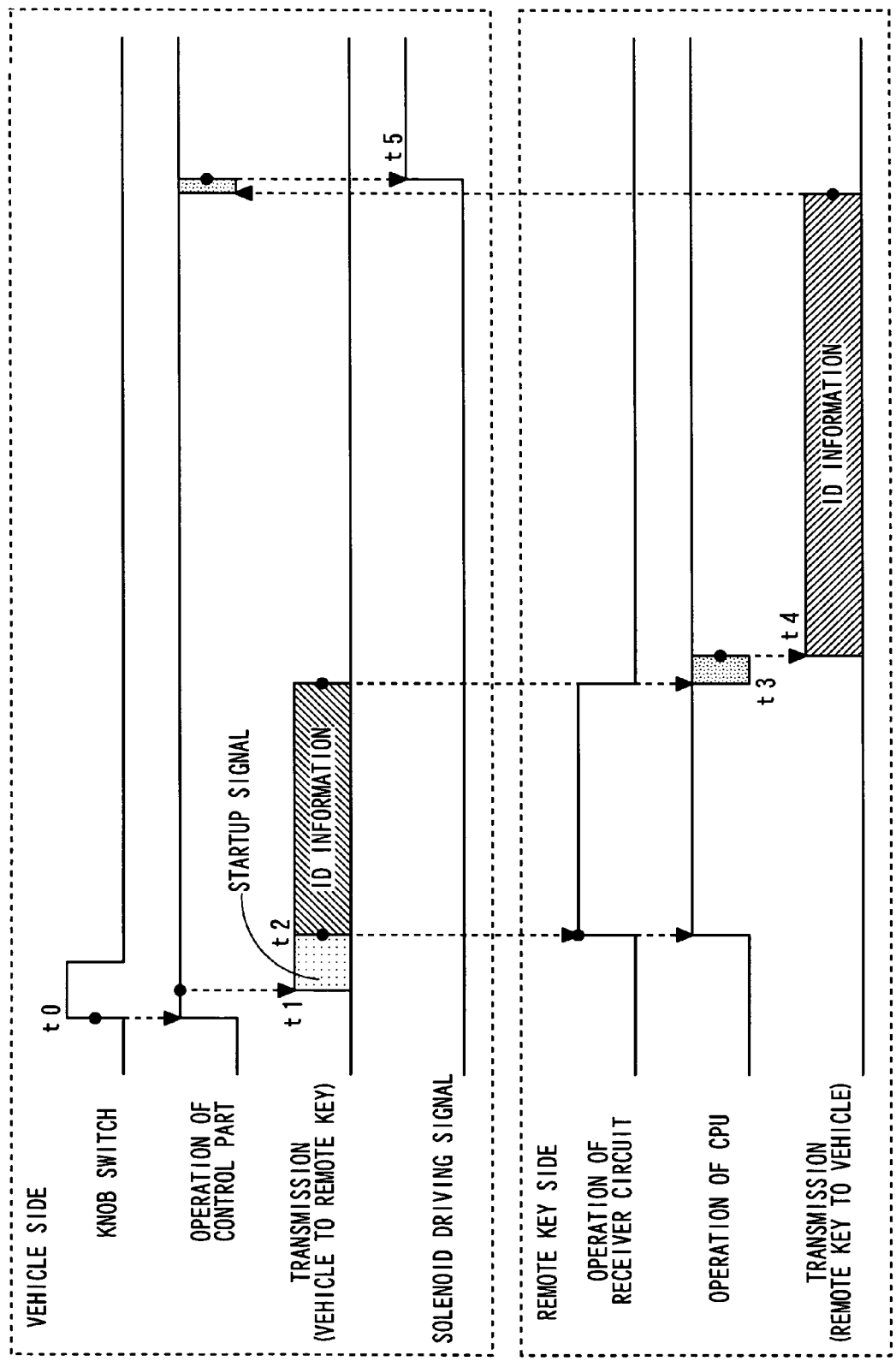
FIG. 9 is a timing chart of operation of the keyless engine starting system.

FIG. 9 is a timing chart showing the operation of the keyless engine starting system. The entire operation of the keyless engine starting system will be explained with reference to FIGS. 6 and 9. First, if the knob 92 of the knob switch 10 is pushed at time t0, the control section 15 starts up. An actuation signal is output from the control section 15 at time t1, and the ID information is sent at time t2.

The control section 15 responses the actuation signal and the receiving circuit 26 on the side of the remote key 100 starts up and at the same time, the CPU 30 of the remote key 100 also starts up. The remote key 100 receives the ID information before time t3, and sends the ID information at time t4. The control section 15 checks the sent ID information and received ID information and if the control section 15 certifies the information, the solenoid 16 is operated at time t5 to release the limit of turning motion of the knob switch 10. The limit of the turning motion of the knob switch 10 is released and the seat unlocking switch 11 is brought into the active state. If the seat unlocking switch 11 is pushed, the solenoid 20 for unlocking the seat lock apparatus 14 is operated.

Although only one click ball is provided on the torque limiter mechanism, a plurality of click balls may be provided.

The invention can widely be applied to vehicles in which an engine starting knob switch is not covered and it is easy to access the vehicle from outside such as four-wheel vehicles, field working vehicles, and construction vehicles, in addition to the two-wheeled motor vehicles. The knob switch is not limited to that described above, and the knob switch may be a switch used for a keyless starting apparatus.

What is claimed is:

1. A motorcycle locking apparatus, comprising:
    a turning shaft connected to a handle lock of a motorcycle for displacing the handle lock to a lock position and an unlock position;
    an operation knob disposed on one end of the turning shaft to turn said turning shaft, wherein the operation knob comprises a cylindrical portion by which the operation knob is turnably fitted along an outer periphery of the turning shaft, and an operating portion connected to the cylindrical portion;
    a connecting means having a torque limiter mechanism for directly connecting the operation knob and the turning shaft to each other; and
    an electromagnetic actuator which engages a pawl member with the turning shaft when the operation knob is in a predetermined handle lock position to limit the turning motion of the turning shaft, and which releases the limitation in response to a releasing signal from outside,
    wherein the torque limiter mechanism comprises a click ball which is accommodated in the turning shaft and resiliently biased in an outer peripheral direction of the turning shaft, and a recess formed in the cylindrical portion of the operation knob such that the click ball is fitted into the recess, and the torque limiter mechanism is configured such that after the connection of the turning shaft and the operation knob is released by a motion of the torque limiter mechanism, when the operation knob is turned to a connecting position corresponding to the handle lock position that is provided on only one place of the turning shaft in relation to a turning direction of the turning shaft, the torque limiter mechanism is reset to connect the operation knob and the turning shaft with each other.

2. The motorcycle locking apparatus according to claim 1, wherein
    a torque limit value of the torque limiter mechanism is equal to or higher than a predetermined turning operation torque of the operation knob and the turning shaft, and is smaller than an engagement strength between the pawl member and the turning shaft.

3. The motorcycle locking apparatus according to claim 1, wherein
    when the torque limiter mechanism is operated and the connection between the turning shaft and the operation knob is released, when the operation knob is turned to the predetermined lock position, the click ball is fitted into the recess formed in the cylindrical portion of the operation knob such that the torque limiter mechanism is being reset.

4. The motorcycle locking apparatus according to claim 1, wherein
    the operation knob is substantially flush with a mounting surface of the lock apparatus with respect to the motorcycle.

5. The motorcycle locking apparatus according to claim 1, further comprising:
    an emergency releasing mechanism for releasing the engagement of the engaging pawl at the time of emergency instead of the electromagnetic actuator;
    an immobilizer sending/receiving circuit which carries out communication with an ECU of the motorcycle to give a starting permission of the motorcycle; and
    a seat unlocking switch for unlocking a seat lock apparatus where the seat also functions as a lid of an accommodating chamber provided in the motorcycle.

* * * * *